United States Patent
Liu et al.

(10) Patent No.: US 12,431,802 B2
(45) Date of Patent: Sep. 30, 2025

(54) MULTILEVEL BUCK CONVERTER WITH VALLEY CURRENT MODE CONTROL AND DUAL SLOPE COMPENSATION

(71) Applicant: RICHTEK TECHNOLOGY CORP., Hsinchu County (TW)

(72) Inventors: Kuo-Chi Liu, Hsinchu (TW); Ta-Yung Yang, Taoyuan (TW); Yi-Min Shiu, Hsinchu (TW)

(73) Assignee: RICHTEK TECHNOLOGY CORP., Hsinchu County (TW)

( * ) Notice: Subject to any disclaimer, the term of this patent is extended or adjusted under 35 U.S.C. 154(b) by 302 days.

(21) Appl. No.: 18/241,232

(22) Filed: Aug. 31, 2023

(65) Prior Publication Data

US 2024/0413749 A1 Dec. 12, 2024

Related U.S. Application Data

(60) Provisional application No. 63/471,775, filed on Jun. 8, 2023.

(51) Int. Cl.
*H02M 3/158* (2006.01)
(52) U.S. Cl.
CPC .................. *H02M 3/158* (2013.01)
(58) Field of Classification Search
CPC .................................................. H02M 3/158
See application file for complete search history.

(56) References Cited

U.S. PATENT DOCUMENTS

| | | | |
|---|---|---|---|
| 9,748,841 B2 * | 8/2017 | Granato | H02M 7/4837 |
| 9,866,113 B1 | 1/2018 | Assaad | |
| 9,929,653 B1 * | 3/2018 | Mercer | H02M 7/4837 |
| 10,090,763 B1 * | 10/2018 | Mercer | H02M 3/1582 |
| 11,228,256 B2 | 1/2022 | Zilio | |
| 2014/0266135 A1 | 9/2014 | Zhak | |
| 2016/0329809 A1 | 11/2016 | Granato | |
| 2018/0367033 A1 * | 12/2018 | Kotikalapoodi | H02M 1/14 |
| 2020/0195133 A1 | 6/2020 | Bonnano | |
| 2022/0029534 A1 * | 1/2022 | Chen | H02M 3/158 |

(Continued)

OTHER PUBLICATIONS

Yousefzadeh, "Three-level buck converter for envelope tracking in RF power amplifiers," Twentieth Annual IEEE Applied Power Electronics Conference and Exposition, Austin, TX, USA, 2005, pp. 1588-1594 vol. 3, Jun. 2005.

(Continued)

*Primary Examiner* — Rafael O De Leon Domenech
(74) *Attorney, Agent, or Firm* — Winston Hsu

(57) ABSTRACT

A multilevel buck converter includes a plurality of switches, an inductor, a flying capacitor, and a control circuit. The plurality of switches are coupled between an input terminal and a ground. The input terminal has an input voltage. The inductor is coupled between the plurality of switches and an output terminal for generating an inductor-current signal. The flying capacitor is coupled to the plurality of switches for generating a flying capacitor voltage. The control circuit is coupled to the output terminal and the plurality of switches for generating a plurality of switching signals according a feedback voltage and the inductor-current signal. The control circuit operates in a valley current mode with dual slope compensation.

20 Claims, 7 Drawing Sheets

(56) References Cited

U.S. PATENT DOCUMENTS

2024/0305194 A1* 9/2024 Anderson ............... H02M 1/38

OTHER PUBLICATIONS

Liu, "A 50MHz 5V 3W 90% efficiency 3-level buck converter with real-time calibration and wide output range for fast-DVS in 65nm CMOS," 2016 IEEE Symposium on VLSI Circuits (VLSI-Circuits), Honolulu, HI, USA, 2016, pp. 1-2. ,Jun. 2016.

Kumar, "A 0.4V~1V 0.2A/mm2 70% efficient 500MHz fully integrated digitally controlled 3-level buck voltage regulator with on-die high density MIM capacitor in 22nm tri-gate CMOS," 2015 IEEE Custom Integrated Circuits Conference (CICC), San Jose, CA, USA, 2015, pp. 1-4 ,Sep. 2015.

* cited by examiner

MULTILEVEL BUCK CONVERTER WITH VALLEY CURRENT MODE CONTROL AND DUAL SLOPE COMPENSATION

CROSS REFERENCE TO RELATED APPLICATIONS

This application claims the benefit of U.S. Provisional Application No. 63/471,775, filed on Jun. 8, 2023. The content of the application is incorporated herein by reference.

BACKGROUND OF THE INVENTION

1. Field of the Invention

The present invention is related to a buck converter, and more particularly to a multilevel buck converter operating in valley current mode with dual slope compensation.

2. Description of the Prior Art

A multilevel buck converter is a type of step-down DC-to-DC converter that can handle high input voltages and achieve high efficiency. It is composed of multiple capacitors and switches that create intermediate voltage levels between the input and output. The voltage across each switch is lower than the input voltage, which reduces the switching losses and the stress on the semiconductors. The output voltage is regulated by controlling the duty cycle of each switch. A multilevel buck converter can also use small inductors and output filters, which reduces the size and weight of the converter. One example of a multilevel buck converter is a three-level buck converter, which includes four capacitors and four switches. It can generate three voltage levels: input, output, and half of the input. A capacitor voltage balancing control is required to ensure that each capacitor maintains its desired voltage level.

A multilevel buck converter can be implemented using eGaN FETs, which have lower on-resistance and faster switching speed than conventional MOSFETs. This can further improve the efficiency and power density of the converter.

Earlier development of multilevel buck converters includes: (1) "Three-level Buck Converter for Envelope Tracking in RF Power Amplifiers" presented at the IEEE Applied Power Electronics Conference and Exposition in 2005; (2) "A 0.4V~1V 0.2 A/mm2 70% efficient 500 MHz fully integrated digitally controlled 3-level buck voltage regulator with on-die high density MIM capacitor in 22 nm tri-gate CMOS" presented at the IEEE Custom Integrated Circuits Conference (CICC) held from September 28 to 30, 2015; (3) "A 50 MHz 5V 3 W 90% Efficiency 3-Level Buck Converter with Real-Time Calibration and Wide Output Range for Fast-DVS in 65 nm CMOS" disclosed at the IEEE Symposium on VLSI Circuits from June 15 to 17, 2016; and (4) "Multi-level Buck Converter with a Flying Capacitor and Charge Pump," U.S. Pat. No. 9,866,113.

However, these earlier inventions face notable disadvantages, such as complex circuitry for capacitor voltage balancing and slow response time of the balancing loop. Another issue lies in the instability occurs when the duty cycle of a switching signal fluctuates around 50% (i.e., less than 50% to greater than 50% and vice versa). This is a situation typically brought on by peak current mode control. There needs a solution to address these limitations.

SUMMARY OF THE INVENTION

An embodiment provides a multilevel buck converter including a plurality of switches, an inductor, a flying capacitor, and a control circuit. The plurality of switches are coupled between an input terminal and a ground. The input terminal has an input voltage. The inductor is coupled between the plurality of switches and an output terminal for generating an inductor-current signal. The flying capacitor is coupled to the plurality of switches for generating a flying capacitor voltage. The control circuit is coupled to the output terminal and the plurality of switches for generating a plurality of switching signals according a feedback voltage and the inductor-current signal. The control circuit operates in a valley current mode with dual slope compensation.

Another embodiment provides a multilevel buck converter including a plurality of switches, an inductor, a flying capacitor, a control circuit, and a VCF-compensation circuit. The plurality of switches are coupled between an input terminal and a ground. The input terminal has an input voltage. The inductor is coupled between the plurality of switches and an output terminal for generating an inductor-current signal. The flying capacitor is coupled to the plurality of switches for generating a flying capacitor voltage. The control circuit is coupled to the output terminal and the plurality of switches for generating a plurality of switching signals according a feedback voltage and the inductor-current signal. The control circuit operates in a valley current mode with dual slope compensation. The VCF-compensation circuit is coupled to the control circuit for generating a duty cycle compensation signal according to the input voltage and the flying capacitor voltage. The duty cycle compensation signal balances the flying capacitor voltage.

Another embodiment provides a multilevel buck converter including a first switch, a second switch, a third switch and a fourth switch, an inductor, a flying capacitor, an error amplifier, a first summation module, a second summation module, a third summation module, a first comparator, a second comparator, a first flip-flop, a second flip-flop, a first buffer, a second buffer, a third buffer and a fourth buffer. The first switch includes a first terminal coupled to an input terminal, a second terminal, and a control terminal. The second switch includes a first terminal coupled to the second terminal of the first switch, a second terminal, and a control terminal. The third switch includes a first terminal coupled to the second terminal of the second switch, a second terminal, and a control terminal. The fourth switch includes a first terminal coupled to the second terminal of the third switch, a second terminal coupled to a ground, and a control terminal. The inductor is coupled between the second terminal of the second switch and the output terminal for generating an inductor-current signal. The flying capacitor is coupled between the second terminal of the first switch and the second terminal of the third switch for generating a flying capacitor voltage. The error amplifier includes an inverting terminal coupled to a feedback terminal for receiving a feedback voltage, a non-inverting terminal for receiving a reference voltage, and an output terminal for outputting an error amplified voltage. The first summation module is coupled to the output terminal of the error amplifier for generating a first slope compensation signal according to a first ramp signal and the error amplified voltage. The second summation module is coupled to the output terminal of the error amplifier for generating a second slope compensation signal according a second ramp signal and the error amplified voltage. The third summation module coupled to the inductor for generating an inductor-sum signal according to the inductor-current signal and a bias voltage. The first comparator includes an inverting terminal coupled to the third summation module, a non-inverting terminal coupled to the first summation module, and an output terminal for generating a first PWM signal according to the first slope compensation signal and the inductor-sum signal. The second comparator includes an inverting terminal coupled to the third summation module, a non-inverting terminal coupled to the second summation module, and an output terminal for generating a second PWM signal according to the second slope compensation signal and the inductor-sum signal. The first flip-flop includes a set terminal coupled to the output terminal of the first comparator, a reset terminal for receiving a first clock signal, an output terminal coupled to the control terminal of the first switch for outputting a first switching signal, and an inverted output terminal coupled to the control terminal of the fourth switch for outputting a fourth switching signal. The second flip-flop includes a set terminal coupled to the output terminal of the second comparator, a reset terminal for receiving a second clock signal, an output terminal coupled to the control terminal of the second switch for outputting a second switching signal, and an inverted output terminal coupled to the control terminal of the third switch for outputting a third switching signal. The first buffer is coupled between the control terminal of the first switch and the output terminal of the first flip-flop. The second buffer is coupled between the control terminal of the second switch and the output terminal of the second flip-flop. The third buffer is coupled between the control terminal of the third switch and the inverted output terminal of the second flip-flop. The fourth buffer is coupled between the control terminal of the fourth switch and the inverted output terminal of the first flip-flop.

These and other objectives of the present invention will no doubt become obvious to those of ordinary skill in the art after reading the following detailed description of the preferred embodiment that is illustrated in the various figures and drawings.

DETAILED DESCRIPTION

The following description is directed to certain implementations for the purposes of describing innovative aspects of this disclosure. However, a person having ordinary skill in the art will readily recognize that the teachings herein can be applied in a multitude of different ways. The disclosure addresses the above-mentioned limitations with an innovative approach of valley current mode control with dual slope compensation. This method streamlines the balancing process for the flying capacitor and eliminates the instability that emerges when the duty cycle of the switching signal deviates from 50%.

In accordance with this disclosure, the term "valley current mode (VCM) control" refers to a type of current-mode control used in buck converters. In valley current mode control, the duty cycle of the switch can be determined by the valley of the inductor current waveform, rather than the peak. It has several advantages over peak current mode control, such as improving dynamic response, reducing sensitivity to load variations and reducing occurrence of sub-harmonic oscillation. However, for valley current mode control, sub-harmonic oscillation may still occur when a duty cycle deviates from 50%. It is necessary to implement slope compensation equal to the up-slope of the inductor current.

Also in accordance with this disclosure, the term "slope compensation" refers to a technique for improving the stability and performance of current mode controlled buck converters. It can be applied to buck converters that operate with duty cycles deviating from 50%. With slope compensation, a resistor is added in series with the inductor. The voltage across this resistor is integrated over a fixed period of time, and the result is subtracted from a reference voltage. This effectively shifts the peak of the inductor current waveform to the left, which makes the converter more stable. Since the slope of the inductor current waveform is not affected by the load current, slope compensation also can effectively reduce the buck converter's sensitivity to load variations.

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
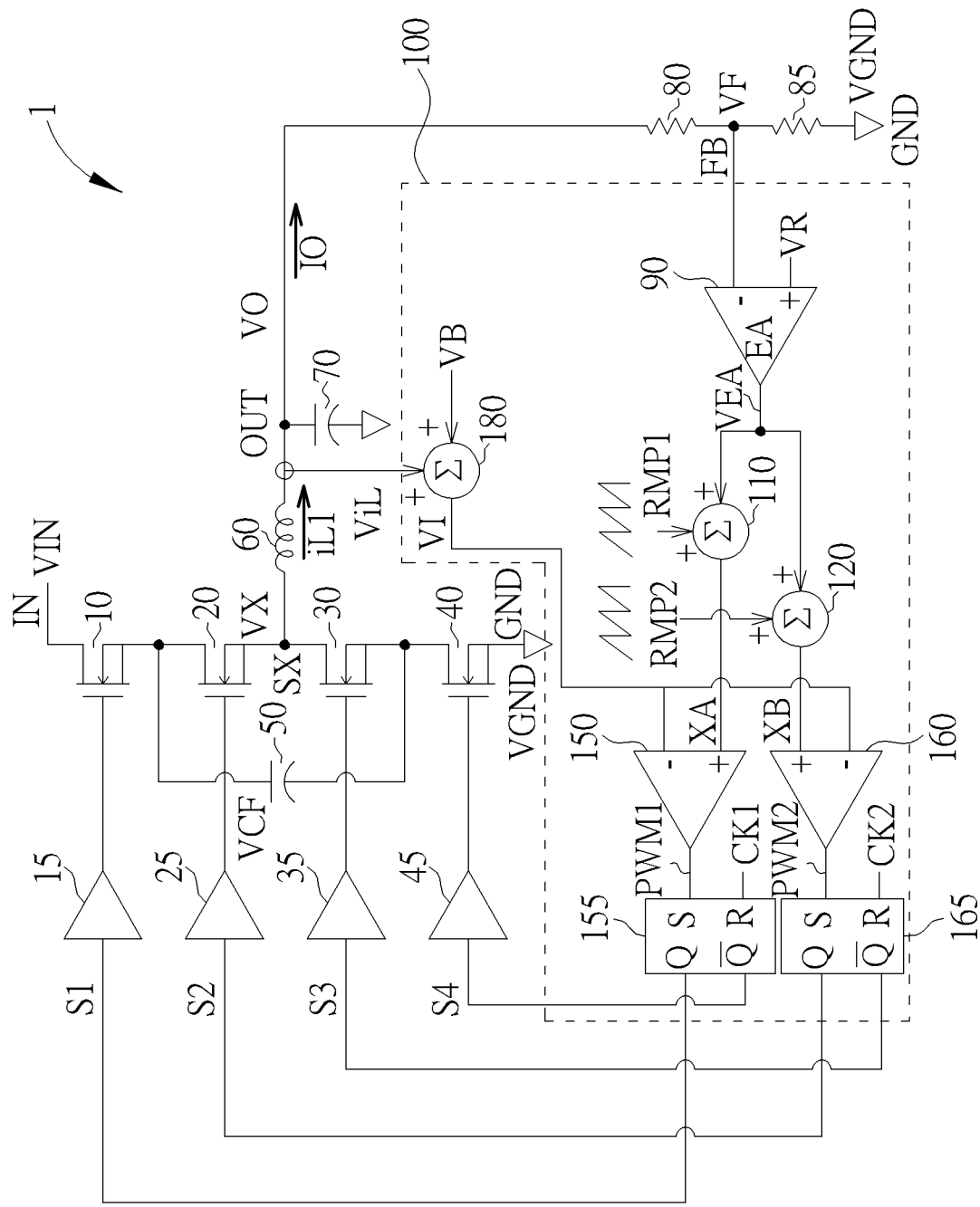
FIG. 1 illustrates an exemplary circuit diagram of a multilevel buck converter of an embodiment.

FIG. 1 illustrates an exemplary circuit diagram of a multilevel buck converter 1 of an embodiment. The multilevel buck converter 1 includes a plurality of switches 10, 20, 30, 40, a flying capacitor 50, an inductor 60, and a control circuit 100. The switches 10, 20, 30 and 40 are coupled between an input terminal IN and a ground GND. The input terminal IN has an input voltage VIN. The inductor 60 is coupled between the switches 10, 20, 30 and 40 and an output terminal OUT for generating an inductor-current signal ViL. The flying capacitor 50 is coupled to the switches 10, 20, 30 and 40 for generating a flying capacitor voltage VCF. The control circuit 100 is coupled to the output terminal OUT and the plurality of switches 10, 20, 30 and 40 for generating a plurality of switching signals S1-S4 according a feedback voltage VF and the inductor-current signal ViL. The control circuit 100 operates in valley current mode with dual slope compensation. The flying capacitor voltage VCF is self-balanced at approximately half of the input voltage VIN.

In more detail, the first switch 10 includes a first terminal coupled to an input terminal IN, a second terminal, and a control terminal. The second switch 20 includes a first terminal coupled to the second terminal of the first switch 10, a second terminal, and a control terminal. The third switch 30 includes a first terminal coupled to the second terminal of the second switch 20, a second terminal, and a control terminal. The fourth switch 40 includes a first terminal coupled to the second terminal of the third switch 30, a second terminal coupled to the ground GND, and a control terminal. The inductor 60 is coupled between a switching node SX and the output terminal OUT. The flying capacitor 50 is coupled between the second terminal of the first switch 10 and the second terminal of the third switch 30.

The control circuit 100 may include an error amplifier 90, summation modules 110, 120, and 180, comparators 150 and 160, flip-flops 155 and 165. The error amplifier 90 may include an inverting terminal coupled to a feedback terminal FB for receiving a feedback voltage VF, a non-inverting terminal for receiving a reference voltage VR, and an output terminal for outputting an error amplified voltage VEA. The summation module 110 may be coupled to the output terminal of the error amplifier 90 for generating a first slope compensation signal XA according to a first ramp signal RMP1 and the error amplified voltage VEA. The summation module 120 may be coupled to the output terminal of the error amplifier 90 for generating a second slope compensation signal XB according a second ramp signal RMP2 and the error amplified voltage VEA. The summation module 180 may be coupled to the inductor 60 for generating an inductor-sum signal VI according to the inductor-current signal ViL and a bias voltage VB. The comparator 150 may include an inverting terminal coupled to the summation module 180, a non-inverting terminal coupled to the summation module 110, and an output terminal for generating a first PWM (pulse-width modulation) signal PWM1 according to the slope compensation signal XA and the inductor-sum signal VI. The comparator 160 may include an inverting terminal coupled to the summation module 180, a non-inverting terminal coupled to the summation module 120, and an output terminal for generating a second PWM signal PWM2 according to the second slope compensation signal XB and the inductor-sum signal VI. The flip-flop 155 may include a set terminal coupled to the output terminal of the comparator 150, a reset terminal for receiving a first clock signal CK1, an output terminal coupled to the control terminal of the first switch 10 for outputting a first switching signal S1, and an inverted output terminal coupled to the control terminal of the fourth switch 40 for outputting a fourth switching signal S4. The flip-flop 165 may include a set terminal coupled to the output terminal of the comparator 160, a reset terminal for receiving a second clock signal CK2, an output terminal coupled to the control terminal of the second switch 20 for outputting a second switching signal S2, and an inverted output terminal coupled to the control terminal of the third switch 30 for outputting a third switching signal S3.

It should be noted that the summation modules 110, 120 and 180 may be circuits for adding up analog signals and/or digital signals, or the equivalent thereof.

The first buffer 15 may be coupled between the control terminal of the first switch 10 and the output terminal of the flip-flop 155. The second buffer 25 may be coupled between the control terminal of the second switch 20 and the output terminal of the flip-flop 165. The third buffer 35 may be coupled between the control terminal of the third switch 30 and the inverted output terminal of the flip-flop 165. The fourth buffer 45 may be coupled between the control terminal of the fourth switch 40 and the inverted output terminal of the flip-flop 155.

A resistor 80 can be coupled between the output terminal OUT and the inverting terminal of the error amplifier 90. Another resistor 85 may be coupled between the ground GND and the inverting terminal of the error amplifier 90. A capacitor 70 may be coupled between the output terminal OUT and the ground GND.

The switches 10, 20, 30 and 40 are equipped with duty cycle control to generate the output voltage VO via the inductor 60. The flying capacitor 50 is used in multilevel buck converter 1 to create voltage levels. Since the flying capacitor 50 is not connected to the ground GND or any other reference voltage, the flying capacitor voltage VCF (i.e., the voltage across the flying capacitor 50) can change rapidly, depending on the switching of the multilevel buck converter 1.

The first ramp signal RMP1 and the second ramp signal RMP2 are antiphase (i.e., 180 degree phase shift). The first ramp signal RMP1 and the second ramp signal RMP2 both can have sawtooth waveforms. The amplitude of the first ramp signal RMP1 can be substantially identical to the amplitude of the second ramp signal RMP2.

The first slope compensation signal XA is generated by adding the first ramp signal RMP1 with the error amplified voltage VEA. The second slope compensation signal XB is generated by adding the second ramp signal RMP2 with the error amplified voltage VEA. The inductor-sum signal VI is generated by adding the inductor-current signal ViL with the bias voltage VB.

The comparator 150 compares the inductor-sum signal VI with the first slope compensation signal XA to generate the first PWM signal PWM1, which can control the switches 10 and 40 through the flip-flop 155. That is, the switches 10 and 40 can be controlled respectively through the switching signals S1 and S4. Similarly, the comparator 160 compares the inductor-sum signal VI with the second slope compensation signal XB to generate the second PWM signal PNM2, which can control the switches 20 and 30 through the flip-flop 165. That is, the switches 20 and 30 can be controlled respectively through the switching signals S2 and S3.

The first switch 10 is turned on by the first switching signal S1 when the inductor-current signal ViL is lower than the first slope compensation signal XA, and the second switch 20 is turned on by the second switching signal S2 when the inductor-current signal ViL is lower than the second slope compensation signal XB. The first switching signal S1 and the second switching signal S2 can be reset to turn off the first switch 10 and the second switch 20 respectively by clock signals CK1 and CK2.

The control circuit 100 can operate in valley current mode with dual slope compensation. The clock signals CK1 and CK2 can determine the switching frequency of the multilevel buck converter 1. The ramp signals RMP1 and RMP2 are synchronized by the clock signals CK1 and CK2 respectively. The clock signals CK1 and CK2 have the same fixed frequency.

When the first switch 10 and the third switch 30 are turned on, a charging current can flow from the input terminal IN to the output terminal OUT through the first switch 10, the flying capacitor 50, the third switch 30, and the inductor 60. When the second switch 20 and the fourth switch 40 are turned on, a discharging current can flow from the flying capacitor 50 to the output terminal OUT through the second switch 20 and the inductor 60. In order to make the magnitude of the charging current substantially equal to the magnitude of the discharging current, the flying capacitor voltage VCF needs to be balanced at half the input voltage VIN (i.e., VIN/2).

Figure 2:
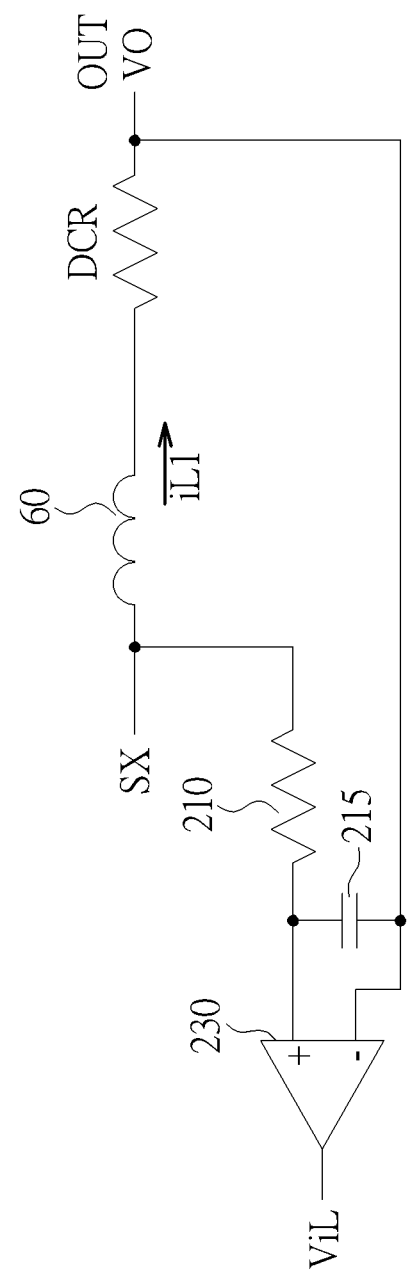
FIG. 2 illustrates an exemplary circuit for generating the inductor-current signal in FIG. 1.

FIG. 2 illustrates an exemplary circuit for generating the inductor-current signal ViL in FIG. 1. The inductor 60 has inductance L1 and parasitic resistance DCR. A resistor 210 with a resistance Rx is coupled to the switching node SX and a non-inverting terminal of a differential amplifier 230. A capacitor 215 with a capacitance Cx is coupled between the non-inverting terminal and the inverting terminal of the differential amplifier 230.

When the time constants of RLC circuit of FIG. 2 are properly tuned, the inductor current iL1 can be obtained from the voltage Vcx across the capacitor 215. The voltage Vcx also equals to the voltage across the inductor 60 (i.e., the voltage generated by the parasitic resistance DCR). The inductor current iL1 can be obtained by the following formulas:

$$Rx \times Cx = \frac{L1}{DCR}$$

$$Vcx = iL1 \times DCR$$

Thus, the differential amplifier 230 can generate the inductor-current signal ViL based on the voltage Vcx across the capacitor 215.

Figure 3:
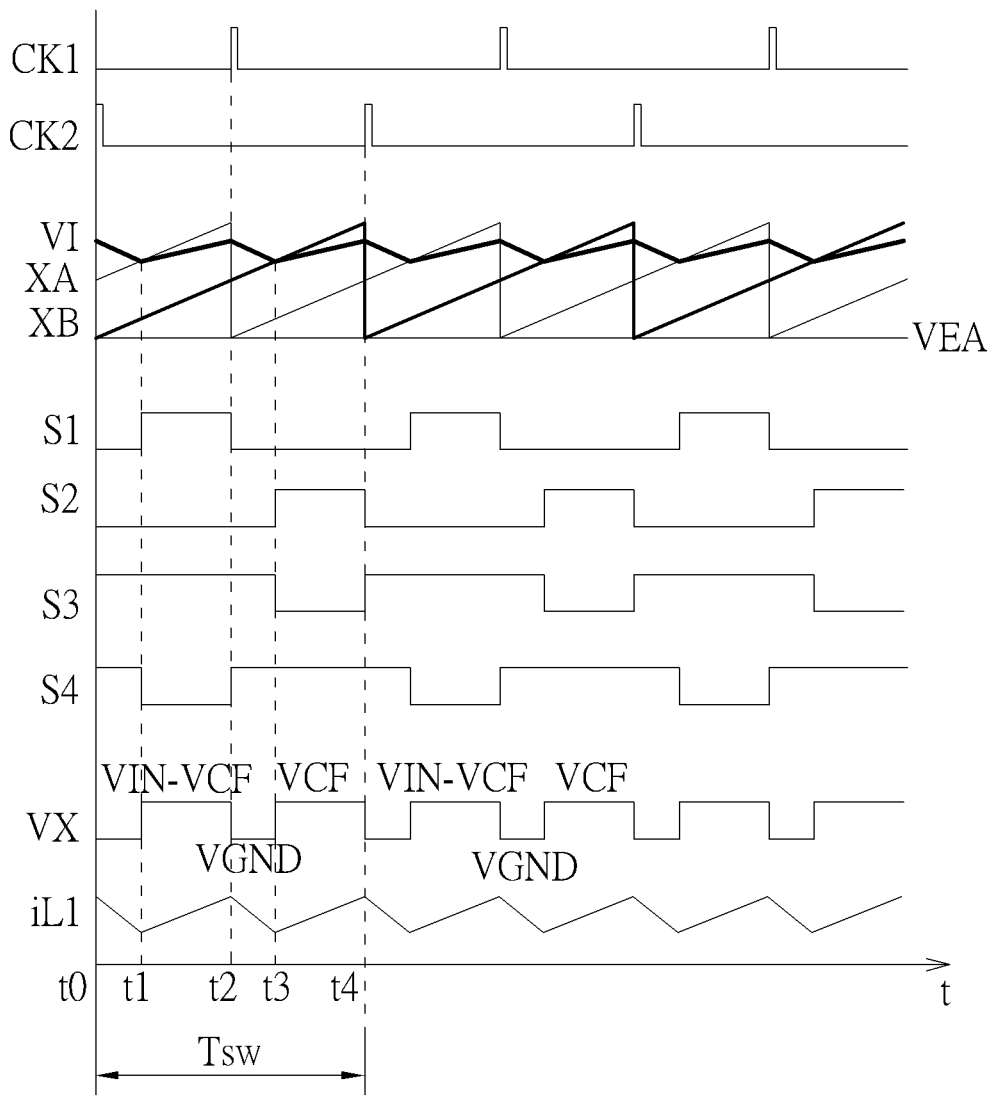
FIG. 3 illustrates a waveform diagram of operations of the multilevel buck converter of FIG. 1.

FIG. 3 illustrates a waveform diagram of operations of the multilevel buck converter 1. This waveform diagram illustrates a scenario that the duty cycles of switching signals S1 and S2 are less than 50%. In this scenario, the output voltage VO is less than half of the input voltage VIN (i.e., VO<VIN/2). The first clock signal CK1 and the second clock signal CK2 are antiphase (i.e., 180 degree phase shift). The ramp signals RMP1 and RMP2 are generated according to the clock signals CK1 and CK2 respectively, thus they are also antiphase. The slope compensation signals XA and XB are ramp signals RMP1 and RMP2 lifted by the error amplified voltage VEA, thus the slope compensation signals XA and XB have the same waveform as the ramp signals RMP1 and RMP2 respectively.

At time t0, the second clock signal CK2 resets the flip-flop 165 such that the second switching signal S2 is at a low level. The first slope compensation signal XA is lower than the inductor-sum signal VI, causing the first PWM signal PWM1 generated by the comparator 150 to be at a low level. Similarly, the second slope compensation signal XB is lower than the inductor-sum signal VI, causing the second PWM signal PWM2 generated by the comparator 160 to be at a low level. Thus, the first switching signal S1 generated by the flip-flop 155 and the second switching signal S2 generated by the flip-flop 165 are also at a low level. Between time t0 and t1, the slope compensation signals XA and XB rise with the ramp signals RMP1 and RMP2.

At time t1, the first slope compensation signal XA surpasses the inductor-sum signal VI, causing the first PWM signal PWM1 to be pulled up to a high level. As a result, the first switching signal S1 is also pulled up to a high level causing the first switch 10 to turn on. At this time, the third switching signal S3 is also pulled up to a high level in a similar manner, causing the third switch 30 to turn on. Accordingly, the voltage VX at the switching node SX is pulled to a high level. Between time t1 and t2, since the switches 10 and 30 are turned on and the switches 20 and 40 are turned off, a current can flow from input terminal IN, passing through the first switch 10, the flying capacitor VCF, the third switch 30 and the inductor 60, to the output terminal OUT. As a result, the inductor-current signal ViL and thus, the inductor-sum signal VI would both rise gradually.

At time t2, the first clock signal CK1 resets the flip-flop 155 such that the first switching signal S1 is pulled down to a low level. The first slope compensation signal XA is pulled down to cross the inductor-sum signal VI, causing the first PWM signal PWM1 generated by the comparator 150 to be at a low level. The second slope compensation signal XB has not reached the inductor-sum signal VI, causing the second PWM signal PWM2 generated by the comparator 160 to remain at a low level. As a result, the first switching signal S1 generated by the flip-flop 155 and the second switching signal S2 generated by the flip-flop 165 are also at a low level. Accordingly, the first switch 10 and the second switch 20 are turned off, and the third switch 30 and the fourth switch 40 are turned on. The voltage VX at the switching node SX is pulled to a high level. Accordingly between time t2 and t3, an inductor current can flow from the inductor 60, passing through the third switch 30 and the fourth switch 40, to the ground GND. As a result, the inductor-current signal ViL and thus, the inductor-sum signal VI would both drop gradually. Also, the slope compensation signals XA and XB again rise with the ramp signals RMP1 and RMP2.

At time t3, the second slope compensation signal XB surpasses the inductor-sum signal VI, causing the second PWM signal PWM2 to be pulled up to a high level. As a result, the second switching signal S2 is also pulled up to a high level causing the second switch 20 to turn on. At this time, the fourth switching signal S4 is also pulled up to a high level in a similar manner, causing the fourth switch 40 to turn on. Accordingly, the voltage VX at the switching node SX is pulled to a high level. Between time t3 and t4, since the switches 20 and 40 are turned on and the switches 10 and 30 are turned off, a current can flow from the flying capacitor VCF, passing through the second switch 20 and the inductor 60, to the output terminal OUT. As a result, the inductor-current signal ViL and thus, the inductor-sum signal VI would both rise gradually.

At time t4, the second clock signal CK2 resets the flip-flop 165 such that the second switching signal S2 is at a low level. The first slope compensation signal XA is lower than the inductor-sum signal VI, causing the first PWM signal PWM1 generated by the comparator 150 to be at a low level. Similarly, the second slope compensation signal XB is lower than the inductor-sum signal VI, causing the second PWM signal PWM2 generated by the comparator 160 to be at a low level. Thus, the first switching signal S1 generated by the flip-flop 155 and the second switching signal S2 generated by the flip-flop 165 are also at a low level.

Time t0 to t4 is a switching period Tsw. The operation of the multilevel buck converter 1 repeats continually in the same manner as in the switching period Tsw, therefore description is not repeated herein. Also, it should be noted that since the inductor current iL1 has essentially the same waveform as the inductor-sum signal VI, it is not discussed separately herein.

As shown in FIG. 3, the high level of voltage VX between time t1 and t2 is substantially equal to the input voltage VIN minus the flying capacitor voltage VCF, which is substantially equal to a half of the input voltage VIN (VIN−VCF=VIN/2). The high level of voltage VX between time t3 and t4 is substantially equal to the flying capacitor voltage VCF, which is also substantially equal to a half of the input voltage VIN (VCF=VIN/2). The low level of voltage VX between time t2 and t3 is substantially equal to the ground reference VGND. Accordingly, through the above-described operation, the flying capacitor voltage VCF can be properly balanced at half the input voltage VIN (i.e., VIN/2).

Figure 4:
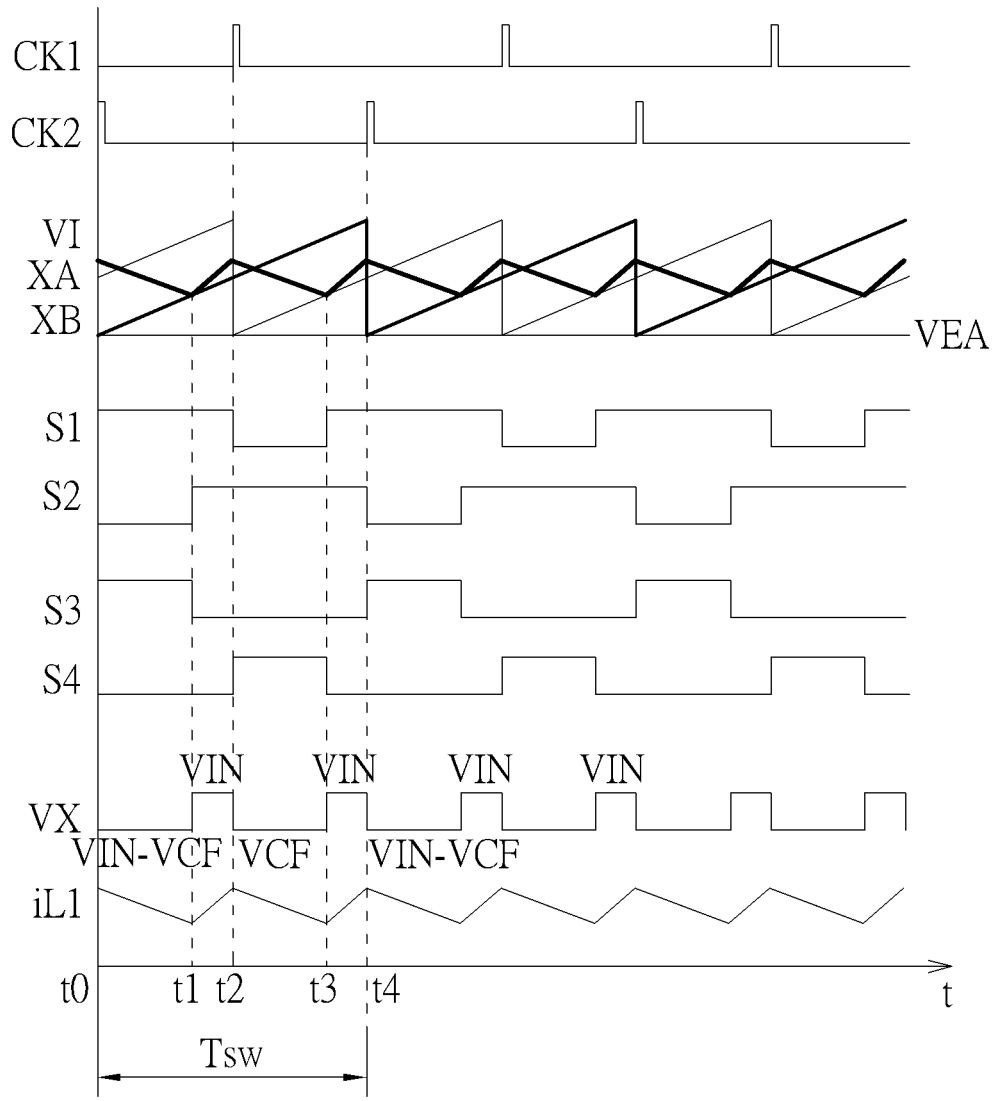
FIG. 4 illustrates another waveform diagram of operations of the multilevel buck converter of FIG. 1.

FIG. 4 illustrates another waveform diagram of operations of the multilevel buck converter 1. This waveform diagram illustrates a scenario that the duty cycles of switching signals S1 and S2 are greater than 50%. In this scenario, the output voltage VO is greater than half of the input voltage VIN (i.e., VO>Vin/2). The first clock signal CK1 and the second clock signal CK2 are antiphase (i.e., 180 degree phase shift). The ramp signals RMP1 and RMP2 are generated according to the clock signals CK1 and CK2 respectively, thus they are also antiphase. The slope compensation signals XA and XB are ramp signals RMP1 and RMP2 lifted by the error amplified voltage VEA, thus the slope compensation signals XA and XB have the same waveform as the ramp signals RMP1 and RMP2 respectively.

At time t0, the second clock signal CK2 resets the flip-flop 165 such that the second switching signal S2 is at a low level. The first switching signal S1 generated by the flip-flop 155 is at a high level. Between time t0 and t1, the slope compensation signals XA and XB rise with the ramp signals RMP1 and RMP2.

At time t1, the second slope compensation signal XB reaches the inductor-sum signal VI, causing the second PWM signal PWM2 to be pulled up to a high level. The first switching signal remains at the high level. As a result, the first switching signal S1 at the high level, causing the first switch 10 to turn on; the second switching signal S2 is pulled up to a high level causing the second switch 20 to turn on. At this time, the third switching signal S3 is also pulled down to a low level, causing the third switch 30 to turn off. The fourth switch 40 is turned off in a similar manner. Accordingly, the voltage VX at the switching node SX is pulled to a high level. Between time t1 and t2, since the switches 10 and 20 are turned on and the switches 30 and 40 are turned off, a current can flow from input terminal IN, passing through the first switch 10, the second switch 20 and the inductor 60, to the output terminal OUT. As a result, the inductor-current signal ViL and thus, the inductor-sum signal VI would both rise gradually.

At time t2, the first clock signal CK1 resets the flip-flop 155 such that the first switching signal S1 is pulled down to a low level. The first slope compensation signal XA is pulled down to lower than the inductor-sum signal VI, causing the first PWM signal PWM1 generated by the comparator 150 to be at a low level. The second slope compensation signal XB has not crossed the inductor-sum signal VI at this time, thus the second PWM signal PWM2 generated by the comparator 160 remains at the high level. As a result, the first switching signal S1 generated by the flip-flop 155 is pulled down to the low level and the second switching signal S2 generated by the flip-flop 165 remains at the high level. Accordingly, the switches 10 and 30 are turned off, and the switches 20 and 40 are turned on. The voltage VX at the switching node SX is pulled to a low level. Accordingly between time t2 and t3, a current can flow from the flying capacitor 50, passing through the second switch 20 and the inductor 60, to the output terminal OUT. As a result, the inductor-current signal ViL and thus, the inductor-sum signal VI would both drop gradually. Also, the slope compensation signals XA and XB again rise with the ramp signals RMP1 and RMP2.

At time t3, the first slope compensation signal XA reaches the inductor-sum signal VI, causing the first PWM signal PWM1 to be pulled up to a high level. As a result, the first switching signal S1 is also pulled up to a high level causing the first switch 10 to turn on. At this time, the second switching signal S2 remains at the high level, causing the second switch 20 to remain turned on. Accordingly, the voltage VX at the switching node SX is pulled to a high level. Between time t3 and t4, since the switches 10 and 20 are turned on and the switches 30 and 40 are turned off, a current can flow from input terminal IN, passing through the first switch 10, the second switch 20 and the inductor 60, to the output terminal OUT. As a result, the inductor-current signal ViL and thus, the inductor-sum signal VI would both rise gradually again.

At time t4, the second clock signal CK2 resets the flip-flop 165 such that the second switching signal S2 is pulled down to the low level. Since the first slope compensation signal XA has not crossed the inductor-sum signal VI at this time, the first PWM signal PWM1 generated by the comparator 150 remains at the high level. As a result, the first switching signal S1 generated by the flip-flop 155 is remains at the high level.

The operation of the multilevel buck converter 1 repeats continually in the same manner as in the switching period Tsw, therefore description is not repeated herein. Also, it should be noted that since the inductor current iL1 have essentially the same waveform as the inductor-sum signal VI, it is not discussed separately herein.

As shown in FIG. 4, the high level of voltage VX between time t1 and t2 and between time t3 and t4 is substantially equal to the input voltage VIN. The low level of voltage VX between time t0 and t1 is substantially to the input voltage VIN minus the flying capacitor voltage VCF, which is substantially equal to a half of the input voltage VIN (VIN−VCF=VIN/2). The low level of voltage VX between time t2 and t3 is substantially equal to the flying capacitor voltage VCF, which is also substantially equal to a half of the input voltage VIN (VCF=VIN/2). Accordingly, through the above-described operation, the flying capacitor voltage VCF can be properly balanced at half the input voltage VIN (i.e., VIN/2).

Figure 5:
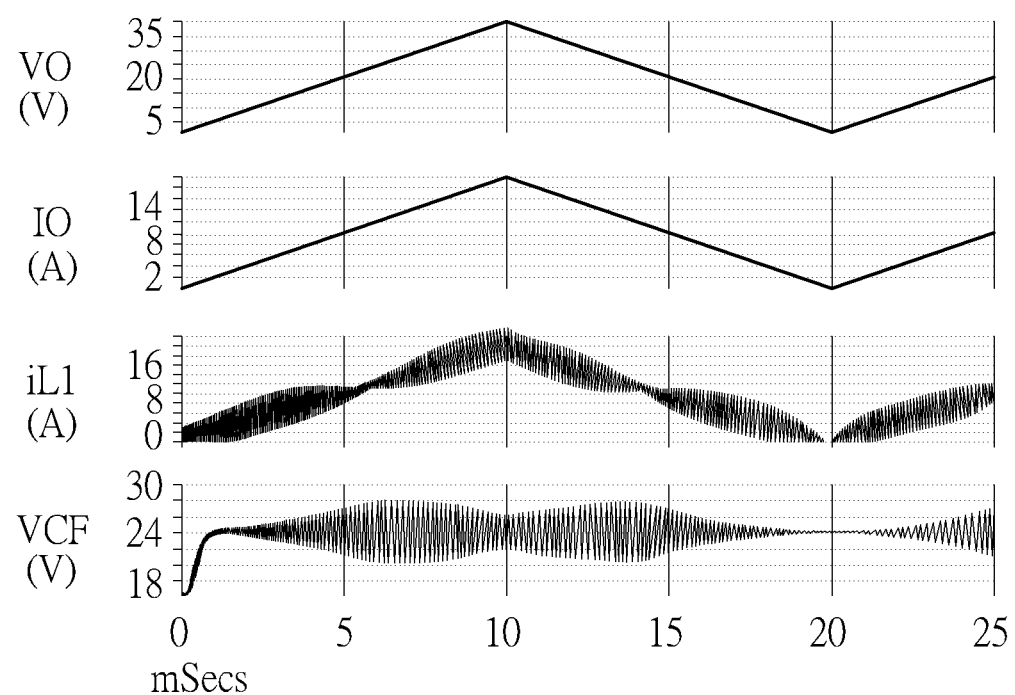
FIG. 5 illustrates another waveform diagram of operations of the multilevel buck converter of FIG. 1.

FIG. 5 illustrates another waveform diagram of operations of the multilevel buck converter 1. In this example, the input voltage VIN is set at 48V, and the output load is designed to be 2Ω. The output voltage VO can be adjusted between 0V and 40V according to the reference voltage VR. The output current IO and the inductor current iL1 vary in response to the output voltage VO. As shown in FIG. 5, the inductor current iL1 has the least ripples (sub-harmonics) when the multilevel buck converter 1 operates at the duty cycle of 50% (i.e., VO=24V). Moreover, the average flying capacitor voltage VCF (with ripples) can be automatically balanced at the half of the input voltage VIN (i.e., VCF=24V) in the multilevel buck converter 1 with the control circuit 100. It shows that the multilevel buck converter 1 can operate properly for all range (i.e., from 0% to 100%).

Figure 6:
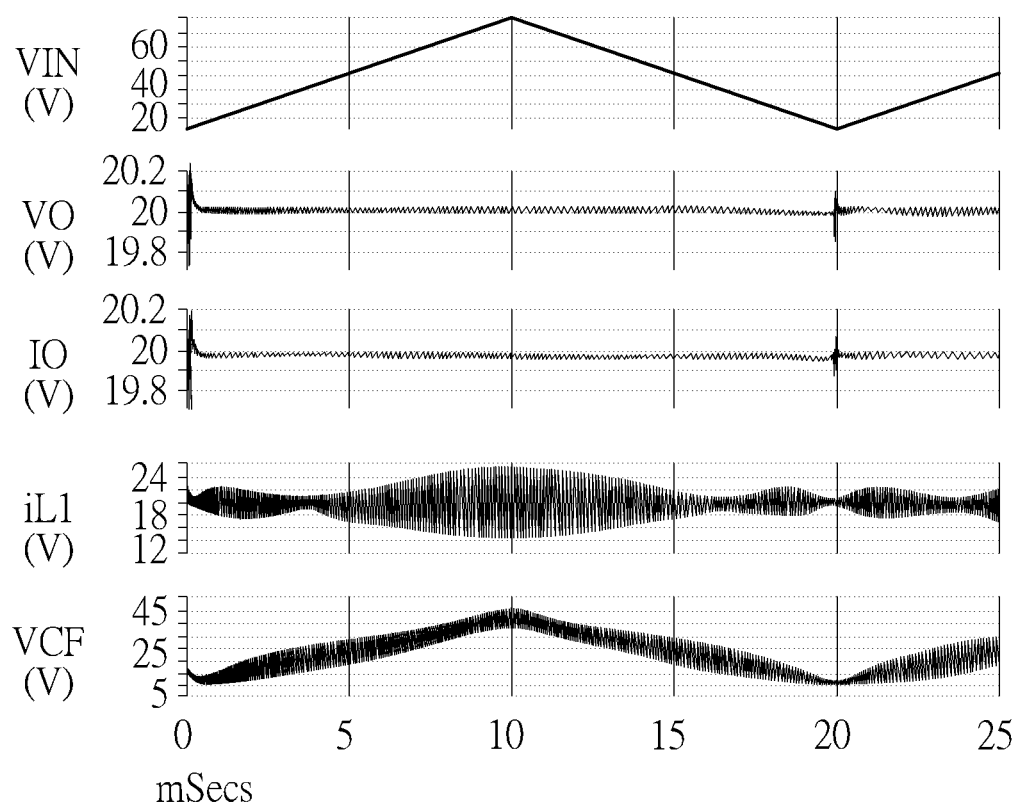
FIG. 6 illustrates another waveform diagram of operations of the multilevel buck converter of FIG. 1.

FIG. 6 illustrates another waveform diagram of operations of the multilevel buck converter 1. In this example, the reference voltage VR is set such that the output voltage is 20V, and the output load is 1Ω. The output voltage VO can be regulated at a fixed 20V when the input voltage VIN varies from 20V to 80V. Further, the output current IO can be regulated at a fixed 20 A. Accordingly, the inductor current iL1 has ripples that vary in response to the input voltage VIN. The average flying capacitor voltage VCF (with ripples) can be automatically balanced at the half of the input voltage VIN (i.e., VIN/2) in the multilevel buck converter 1 with the control circuit 100. Similarly, the inductor current iL1 has the least ripples when the multilevel buck converter 1 operates at the duty cycle of 50% (i.e., VIN=40V). It shows that the multilevel buck converter 1 can operate properly for all range (i.e., from 0% to 100%). In addition, it should be noted that the ripples in flying capacitor voltage VCF and the inductor current iL1 in the above examples can be triangular waves.

Figure 7:
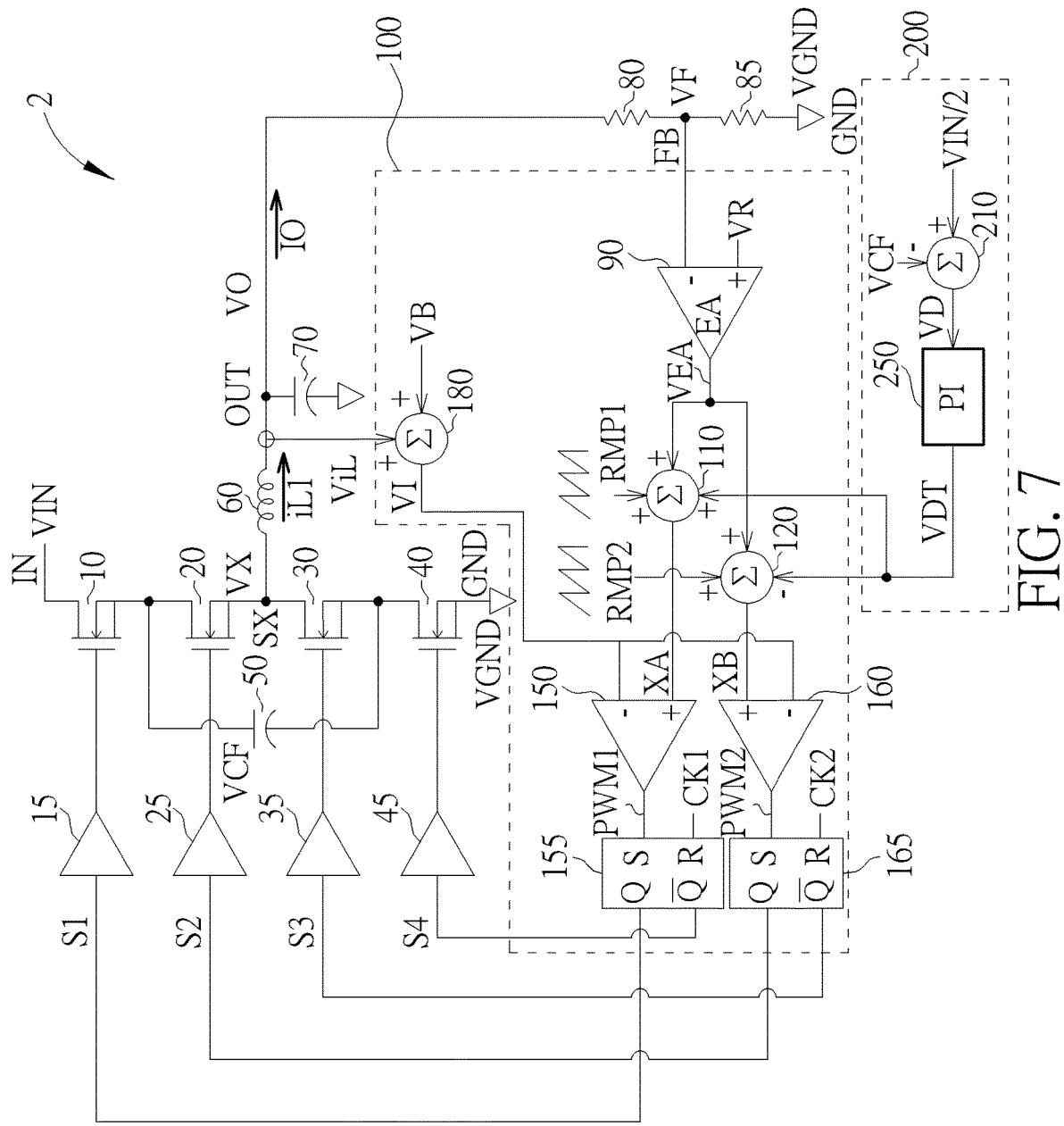
FIG. 7 illustrates an exemplary circuit diagram of a multilevel buck converter of another embodiment.

FIG. 7 illustrates an exemplary circuit diagram of a multilevel buck converter 2 of another embodiment. The difference between the multilevel buck converter 1 and the multilevel buck converter 2 is that the multilevel buck converter 2 further includes a VCF-compensation circuit 200 coupled to the control circuit 100. The VCF-compensation circuit 200 is used to generate a duty cycle compensation signal according to the input voltage VIN and the flying capacitor voltage VCF.

The VCF-compensation circuit 200 may include a subtraction module 210 and a gain adjustment module 250. The subtraction module 210 can receive an half of the input voltage VIN (i.e., VIN/2) and flying capacitor voltage VCF, and can generate a difference voltage VD accordingly. The gain adjustment module 250 can be coupled to the subtraction module 210 for generating the duty cycle compensation signal VDT according to the difference voltage VD. An output of the gain adjustment module 250 can be coupled to the summation modules 110 and 120. It should be noted that the subtraction module 210, may be a circuit for subtracting analog signals and/or digital signals, or the equivalent thereof. The gain adjustment module 250 may be a proportional integrator or the equivalent thereof.

In this embodiment, the summation module 110 can generate a first slope compensation signal XA according to the duty cycle compensation signal VDT, the first ramp signal RMP1 and the error amplified voltage VEA. The summation module 120 can generate a second slope compensation signal XB according an inverse of the duty cycle compensation signal VDT, the second ramp signal RMP and the error amplified voltage VEA. The duty cycle compensation signal VDT can be generated to fine-tune the duty cycles of the switching signals S1-S4 when the difference voltage VD between the flying capacitor voltage VCF and the half of the input voltage VIN (i.e., VIN/2) exceeds a threshold. Thus, the VCF-compensation circuit 200 can achieve feedback stabilization for the multilevel buck converter 2.

Similar to the multilevel buck converter 1, the multilevel buck converter 2 includes a plurality of switches 10, 20, 30 and 40, a flying capacitor 50, an inductor 60, and a control circuit 100. The switches 10, 20, 30 and 40 are coupled between an input terminal IN and a ground GND. The input terminal IN has an input voltage VIN. The inductor 60 is coupled between the switches 10, 20, 30 and 40 and an output terminal OUT for generating an inductor-current signal ViL. The flying capacitor 50 is coupled to the switches 10, 20, 30 and 40 for generating a flying capacitor voltage VCF. The control circuit 100 is coupled to the output terminal OUT and the plurality of switches 10, 20, 30 and 40 for generating a plurality of switching signals S1-S4 according a feedback voltage VF and the inductor-current signal ViL. The control circuit 100 operates in valley current mode with dual slope compensation. The flying capacitor voltage VCF is self-balanced at approximately half of the input voltage VIN.

The first switch 10 includes a first terminal coupled to an input terminal IN, a second terminal, and a control terminal. The second switch 20 includes a first terminal coupled to the second terminal of the first switch 10, a second terminal, and a control terminal. The third switch 30 includes a first terminal coupled to the second terminal of the second switch 20, a second terminal, and a control terminal. The fourth switch 40 includes a first terminal coupled to the second terminal of the third switch 30, a second terminal coupled to the ground GND, and a control terminal. The inductor 60 is coupled between a switching node SX and the output terminal OUT. The flying capacitor 50 is coupled between the second terminal of the first switch 10 and the second terminal of the third switch 30.

The control circuit 100 may include an error amplifier 90, summation modules 110, 120, and 180, comparators 150 and 160, flip-flops 155 and 165. The error amplifier 90 may include an inverting terminal coupled to a feedback terminal FB for receiving a feedback voltage VF, a non-inverting terminal for receiving a reference voltage VR, and an output terminal for outputting an error amplified voltage VEA.

In this particular embodiment, the summation module 110 can generate a first slope compensation signal XA according to the duty cycle compensation signal VDT, a first ramp signal RMP1 and the error amplified voltage VEA. The summation module 120 can generate a second slope compensation signal XB according an inverse of the duty cycle compensation signal VDT, a second ramp signal RMP and the error amplified voltage VEA.

The summation module 180 may be coupled to the inductor 60 for generating an inductor-sum signal VI according to the inductor-current signal ViL and a bias voltage VB. The comparator 150 may include an inverting terminal coupled to the summation module 180, a non-inverting terminal coupled to the summation module 110, and an output terminal for generating a first PWM (pulse-width modulation) signal PWM1 according to the slope compensation signal XA and the inductor-sum signal VI. The comparator 160 may include an inverting terminal coupled to the summation module 180, a non-inverting terminal coupled to the summation module 120, and an output terminal for generating a second PWM signal PWM2 according to the second slope compensation signal XB and the inductor-sum signal VI. The flip-flop 155 may include a set terminal coupled to the output terminal of the comparator 150, a reset terminal for receiving a first clock signal CK1, an output terminal coupled to the control terminal of the first switch 10 for outputting a first switching signal S1, and an inverted output terminal coupled to the control terminal of the fourth switch 40 for outputting a fourth switching signal S4. The flip-flop 165 may include a set terminal coupled to the output terminal of the comparator 160, a reset terminal for receiving a second clock signal CK2, an output terminal coupled to the control terminal of the second switch 20 for outputting a second switching signal S2, and an inverted output terminal coupled to the control terminal of the third switch 30 for outputting a third switching signal S3.

The first buffer 15 may be coupled between the control terminal of the first switch 10 and the output terminal of the flip-flop 155. The second buffer 25 may be coupled between the control terminal of the second switch 20 and the output terminal of the flip-flop 165. The third buffer 35 may be coupled between the control terminal of the third switch 30 and the inverted output terminal of the flip-flop 165. The fourth buffer 45 may be coupled between the control terminal of the fourth switch 40 and the inverted output terminal of the flip-flop 155.

A resistor 80 can be coupled between the output terminal OUT and the inverting terminal of the error amplifier 90. Another resistor 85 may be coupled between the ground GND and the inverting terminal of the error amplifier 90. A capacitor 70 may be coupled between the output terminal OUT and the ground GND.

The duty cycle compensation signal VDT can be generated to fine-tune the duty cycles of the switching signals S1-S4 when the difference voltage VD between the flying capacitor voltage VCF and the half of the input voltage VIN (i.e., VIN/2) exceeds a threshold. Thus, VCF-compensation circuit 200 can achieve feedback stabilization for the multilevel buck converter 2.

Except for the feedback stabilization, the operation principle of the multilevel buck converter 2 is almost identical that the multilevel buck converter 1. Thus, the description is not repeated herein.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multilevel buck converter comprising:
a plurality of switches coupled between an input terminal and a ground, the input terminal having an input voltage;
an inductor coupled between the plurality of switches and an output terminal, and configured to generate an inductor-current signal;
a flying capacitor coupled to the plurality of switches, and configured to generate a flying capacitor voltage; and
a control circuit coupled to the output terminal and the plurality of switches, configured to generate a plurality of switching signals according a feedback voltage and the inductor-current signal;

wherein the control circuit operates in a valley current mode with dual slope compensation.

2. The multilevel buck converter of claim 1, wherein the flying capacitor voltage is self-balanced at approximately half of the input voltage.

3. The multilevel buck converter of claim 1, wherein the plurality of switches comprise:
a first switch comprising:
a first terminal coupled to the input terminal;
a second terminal; and
a control terminal coupled to the control circuit;
a second switch comprising:
a first terminal coupled to the second terminal of the first switch;
a second terminal; and
a control terminal coupled to the control circuit;
a third switch comprising:
a first terminal coupled to the second terminal of the second switch;
a second terminal; and
a control terminal coupled to the control circuit; and
a fourth switch comprising:
a first terminal coupled to the second terminal of the third switch;
a second terminal coupled to the ground; and
a control terminal coupled to the control circuit.

4. The multilevel buck converter of claim 3, wherein the flying capacitor is coupled between the second terminal of the first switch and the second terminal of the third switch, and the inductor is coupled between the second terminal of the second switch and the output terminal.

5. The multilevel buck converter of claim 3, wherein the control circuit comprises:
an error amplifier comprising:
an inverting terminal coupled to a feedback terminal, and configured to receive the feedback voltage;
a non-inverting terminal configured to receive a reference voltage; and
an output terminal configured to output an error amplified voltage;
a first summation module coupled to the output terminal of the error amplifier, and configured to generate a first slope compensation signal according to a first ramp signal and the error amplified voltage;
a second summation module coupled to the output terminal of the error amplifier, and configured to generate a second slope compensation signal according a second ramp signal and the error amplified voltage;
a third summation module coupled to the inductor, and configured to generate an inductor-sum signal according to the inductor-current signal and a bias voltage;
a first comparator comprising:
an inverting terminal coupled to the third summation module;
a non-inverting terminal coupled to the first summation module; and
an output terminal configured to generate a first PWM (pulse-width modulation) signal according to the first slope compensation signal and the inductor-sum signal;
a second comparator comprising:
an inverting terminal coupled to the third summation module;
a non-inverting terminal coupled to the second summation module; and
an output terminal configured to generate a second PWM signal according to the second slope compensation signal and the inductor-sum signal;
a first flip-flop comprising:
a set terminal coupled to the output terminal of the first comparator;
a reset terminal configured to receive a first clock signal;
an output terminal coupled to the control terminal of the first switch, configured to output a first switching signal; and
an inverted output terminal coupled to the control terminal of the fourth switch, configured to output a fourth switching signal; and
a second flip-flop comprising:
a set terminal coupled to the output terminal of the second comparator;
a reset terminal configured to receive a second clock signal;
an output terminal coupled to the control terminal of the second switch, configured to output a second switching signal; and
an inverted output terminal coupled to the control terminal of the third switch, configured to output a third switching signal.

6. The multilevel buck converter of claim 5, wherein:
the first ramp signal and the second ramp signal are antiphase;
the first ramp signal and the second ramp signal have sawtooth waveforms; and
amplitude of the first ramp signal is substantially identical to amplitude of the second ramp signal.

7. The multilevel buck converter of claim 5 further comprising:
a first buffer coupled between the control terminal of the first switch and the output terminal of the first flip-flop;
a second buffer coupled between the control terminal of the second switch and the output terminal of the second flip-flop;
a third buffer coupled between the control terminal of the third switch and the inverted output terminal of the second flip-flop; and
a fourth buffer coupled between the control terminal of the fourth switch and the inverted output terminal of the first flip-flop.

8. The multilevel buck converter of claim 5 further comprising:
a first resistor coupled between the output terminal and the inverting terminal of the error amplifier;
a second resistor coupled between the ground and the inverting terminal of the error amplifier; and
a capacitor coupled between the output terminal and the ground.

9. The multilevel buck converter of claim 5, wherein the first switch is turned on when the inductor-current signal is lower than the first slope compensation signal, and the second switch is turned on when the inductor-current signal is lower than the second slope compensation signal.

10. The multilevel buck converter of claim 5, wherein the third switching signal is an inverse of the second switching signal, and the fourth switching signal is an inverse of the first switching signal.

11. A multilevel buck converter comprising:
a plurality of switches coupled between an input terminal and a ground, the input terminal having an input voltage;

an inductor coupled between the plurality of switches and an output terminal, and configured to generate an inductor-current signal;

a flying capacitor coupled to the plurality of switches, and configured to generate a flying capacitor voltage;

a control circuit coupled to the output terminal and the plurality of switches, configured to generate a plurality of switching signals according a feedback voltage and the inductor-current signal; and a VCF-compensation circuit coupled to the control circuit, and configured to generate a duty cycle compensation signal according to the input voltage and the flying capacitor voltage;

wherein:
the control circuit operates in a valley current mode with dual slope compensation; and
the duty cycle compensation signal balances the flying capacitor voltage.

12. The multilevel buck converter of claim 11, wherein a flying capacitor voltage is self-balanced at approximately half of the input voltage.

13. The multilevel buck converter of claim 11, wherein the plurality of switches comprise:

a first switch comprising:
a first terminal coupled to the input terminal;
a second terminal; and
a control terminal coupled to the control circuit;

a second switch comprising:
a first terminal coupled to the second terminal of the first switch;
a second terminal; and
a control terminal coupled to the control circuit;

a third switch comprising:
a first terminal coupled to the second terminal of the second switch;
a second terminal; and
a control terminal coupled to the control circuit; and a fourth switch comprising:
a first terminal coupled to the second terminal of the third switch;
a second terminal coupled to the ground; and
a control terminal coupled to the control circuit.

14. The multilevel buck converter of claim 13, wherein the flying capacitor is coupled between the second terminal of the first switch and the second terminal of the third switch, and the inductor is coupled between the second terminal of the second switch and the output terminal.

15. The multilevel buck converter of claim 13, wherein the VCF-compensation circuit comprises:

a subtraction module configured to generate a difference voltage of an half of the input voltage and flying capacitor voltage; and a gain adjustment module coupled to the subtraction module, and configured to generate the duty cycle compensation signal according to the difference voltage.

16. The multilevel buck converter of claim 15, wherein the control circuit comprises:

an error amplifier comprising:
an inverting terminal coupled to a feedback terminal, and configured to receive the feedback voltage;
a non-inverting terminal configured to receive a reference voltage; and
an output terminal configured to output an error amplified voltage;

a first summation module coupled to the output terminal of the error amplifier, and configured to generate a first slope compensation signal according to the duty cycle compensation signal, a first ramp signal and the error amplified voltage;

a second summation module coupled to the output terminal of the error amplifier, and configured to generate a second slope compensation signal according an inverse of the duty cycle compensation signal, a second ramp signal and the error amplified voltage;

a third summation module coupled to the inductor, and configured to generate an inductor-sum signal according to the inductor-current signal and a bias voltage;

a first comparator comprising:
an inverting terminal coupled to the third summation module;
a non-inverting terminal coupled to the first summation module; and
an output terminal configured to generate a first PWM (pulse-width modulation) signal according to the first slope compensation signal and the inductor-sum signal;

a second comparator comprising:
an inverting terminal coupled to the third summation module;
a non-inverting terminal coupled to the second summation module; and
an output terminal configured to generate a second PWM signal according to the second slope compensation signal and the inductor-sum signal;

a first flip-flop comprising:
a set terminal coupled to the output terminal of the first comparator;
a reset terminal configured to receive a first clock signal;
an output terminal coupled to the control terminal of the first switch, configured to output a first switching signal; and
an inverted output terminal coupled to the control terminal of the fourth switch, configured to output a fourth switching signal; and a second flip-flop comprising:
a set terminal coupled to the output terminal of the second comparator;
a reset terminal configured to receive a second clock signal;
an output terminal coupled to the control terminal of the second switch, configured to output a second switching signal; and
an inverted output terminal coupled to the control terminal of the third switch, configured to output a third switching signal.

17. The multilevel buck converter of claim 16, wherein:
the first ramp signal and the second ramp signal are antiphase;
the first ramp signal and the second ramp signal have sawtooth waveforms; and
amplitude of the first ramp signal is substantially identical to amplitude of the second ramp signal.

18. The multilevel buck converter of claim 16 further comprising:

a first buffer coupled between the control terminal of the first switch and the output terminal of the first flip-flop;

a second buffer coupled between the control terminal of the second switch and the output terminal of the second flip-flop;

a third buffer coupled between the control terminal of the third switch and the inverted output terminal of the second flip-flop; and a fourth buffer coupled between the control terminal of the fourth switch and the inverted output terminal of the first flip-flop.

19. The multilevel buck converter of claim 16 further comprising:
a first resistor coupled between the output terminal and the inverting terminal of the error amplifier;
a second resistor coupled between the ground and the inverting terminal of the error amplifier; and
a capacitor coupled between the output terminal and the ground.

20. A multilevel buck converter comprising:
a first switch comprising:
   a first terminal coupled to an input terminal, the input terminal having an input voltage;
   a second terminal; and
   a control terminal;
a second switch comprising:
   a first terminal coupled to the second terminal of the first switch;
   a second terminal; and
   a control terminal;
a third switch comprising:
   a first terminal coupled to the second terminal of the second switch;
   a second terminal; and
   a control terminal;
a fourth switch comprising:
   a first terminal coupled to the second terminal of the third switch;
   a second terminal coupled to a ground; and
   a control terminal;
an inductor coupled between the second terminal of the second switch and the output terminal, and configured to generate an inductor-current signal;
a flying capacitor coupled between the second terminal of the first switch and the second terminal of the third switch, and configured to generate a flying capacitor voltage;
an error amplifier comprising:
   an inverting terminal coupled to a feedback terminal, and configured to receive a feedback voltage;
   a non-inverting terminal configured to receive a reference voltage; and
   an output terminal configured to output an error amplified voltage;
a first summation module coupled to the output terminal of the error amplifier, and configured to generate a first slope compensation signal according to a first ramp signal and the error amplified voltage;
a second summation module coupled to the output terminal of the error amplifier, and configured to generate a second slope compensation signal according a second ramp signal and the error amplified voltage;
a third summation module coupled to the inductor, and configured to generate an inductor-sum signal according to the inductor-current signal and a bias voltage;
a first comparator comprising:
   an inverting terminal coupled to the third summation module;
   a non-inverting terminal coupled to the first summation module; and
   an output terminal configured to generate a first PWM signal according to the first slope compensation signal and the inductor-sum signal;
a second comparator comprising:
   an inverting terminal coupled to the third summation module;
   a non-inverting terminal coupled to the second summation module; and
   an output terminal configured to generate a second PWM signal according to the second slope compensation signal and the inductor-sum signal;
a first flip-flop comprising:
   a set terminal coupled to the output terminal of the first comparator;
   a reset terminal configured to receive a first clock signal;
   an output terminal coupled to the control terminal of the first switch, configured to output a first switching signal; and
   an inverted output terminal coupled to the control terminal of the fourth switch, configured to output a fourth switching signal;
a second flip-flop comprising:
   a set terminal coupled to the output terminal of the second comparator;
   a reset terminal configured to receive a second clock signal;
   an output terminal coupled to the control terminal of the second switch, configured to output a second switching signal; and
   an inverted output terminal coupled to the control terminal of the third switch, configured to output a third switching signal;
a first buffer coupled between the control terminal of the first switch and the output terminal of the first flip-flop;
a second buffer coupled between the control terminal of the second switch and the output terminal of the second flip-flop;
a third buffer coupled between the control terminal of the third switch and the inverted output terminal of the second flip-flop; and
a fourth buffer coupled between the control terminal of the fourth switch and the inverted output terminal of the first flip-flop.

* * * * *